(12) United States Patent
Ozga

(10) Patent No.: US 11,056,020 B2
(45) Date of Patent: Jul. 6, 2021

(54) METHOD, SYSTEM, AND APPARATUS FOR MODELING A HUMAN TRACHEA

(71) Applicant: William Ozga, Providence, RI (US)

(72) Inventor: William Ozga, Providence, RI (US)

( * ) Notice: Subject to any disclaimer, the term of this patent is extended or adjusted under 35 U.S.C. 154(b) by 346 days.

(21) Appl. No.: 16/180,195

(22) Filed: Nov. 5, 2018

(65) Prior Publication Data
US 2020/0143708 A1  May 7, 2020

(51) Int. Cl.
*G09B 23/28* (2006.01)
*G09B 23/34* (2006.01)

(52) U.S. Cl.
CPC .......... *G09B 23/288* (2013.01); *G09B 23/34* (2013.01)

(58) Field of Classification Search
CPC .... G09B 23/28; G09B 23/285; G09B 23/288; G09B 23/30; G09B 23/303; G09B 23/32; G09B 23/34
USPC ......................................... 434/267, 270, 272
See application file for complete search history.

(56) References Cited

U.S. PATENT DOCUMENTS

| | | | | |
|---|---|---|---|---|
| 3,200,515 A * | 8/1965 | Daigre | ...................... | B44C 5/06 434/296 |
| 3,471,944 A * | 10/1969 | Breckwoldt | ........... | G09B 23/30 434/270 |
| 3,874,093 A * | 4/1975 | Garbe | ................... | G09B 23/285 434/265 |
| 4,209,919 A * | 7/1980 | Kirikae | .................. | G09B 23/30 434/270 |
| 4,484,896 A * | 11/1984 | Kohnke | ............... | G09B 23/285 434/265 |
| 4,773,865 A * | 9/1988 | Baldwin | ................ | G09B 23/30 434/267 |
| 5,823,787 A * | 10/1998 | Gonzalez | ............... | G09B 23/28 434/265 |
| 5,846,087 A * | 12/1998 | Scherer | ................ | G09B 23/285 434/270 |
| 6,296,490 B1 * | 10/2001 | Bowden | ............... | G09B 23/288 434/265 |
| 6,609,521 B1 * | 8/2003 | Belani | ................... | A61M 16/04 128/207.14 |
| 7,507,092 B2 * | 3/2009 | Sakezles | ................ | G09B 23/28 434/267 |
| 9,679,501 B2 * | 6/2017 | Sakezles | ................ | G09B 23/34 |
| 9,761,154 B2 * | 9/2017 | Williams | ............. | G09B 23/288 |
| 9,865,179 B2 * | 1/2018 | Segall | .................... | G09B 23/28 |

(Continued)

*Primary Examiner* — Joseph B Baldori
(74) *Attorney, Agent, or Firm* — Maier & Maier, PLLC

(57) ABSTRACT

An anatomical model and method of using the same may be disclosed. The anatomical model may teach proper airway management, including intubation of the human trachea on a patient having upper airway obstruction(s). The anatomical model may include a simulated trachea structure having a proximal end, a distal end, and an elongated tubular body extending therebetween, the elongated tubular body defining a central bore of a predetermined diameter; an artificial skin layer positioned over an exterior surface of the tubular body; an opening formed through the artificial skin layer and extending within the simulated trachea structure, the opening being configured to receive a tracheostomy tube; a foam material embedded underneath the artificial skin layer proximate the opening; and at least one airway obstructive element connected to the simulated trachea structure for causing a volume restriction of the central bore.

19 Claims, 8 Drawing Sheets

(56) References Cited

U.S. PATENT DOCUMENTS

| | | | |
|---|---|---|---|
| 10,037,716 B2* | 7/2018 | Yang | G09B 23/32 |
| 10,078,973 B2* | 9/2018 | Barsness | G09B 23/285 |
| 2005/0244801 A1* | 11/2005 | DeSalvo | A61B 1/267 |
| | | | 434/262 |
| 2007/0218438 A1* | 9/2007 | Sanders | G09B 23/30 |
| | | | 434/236 |
| 2008/0241807 A1* | 10/2008 | Johns | G09B 23/285 |
| | | | 434/267 |
| 2008/0305464 A1* | 12/2008 | Lynn | G09B 23/288 |
| | | | 434/265 |
| 2011/0010155 A1* | 1/2011 | Takanishi | G09B 23/32 |
| | | | 703/11 |
| 2011/0045450 A1* | 2/2011 | Nuttal | G09B 23/30 |
| | | | 434/267 |
| 2012/0077169 A1* | 3/2012 | Takeda | G09B 23/288 |
| | | | 434/267 |
| 2015/0213731 A1* | 7/2015 | Sato | A61B 1/2676 |
| | | | 434/272 |
| 2016/0140879 A1* | 5/2016 | Hananel | G09B 23/288 |
| | | | 434/270 |
| 2016/0293055 A1* | 10/2016 | Hofstetter | G09B 23/30 |
| 2017/0169733 A1* | 6/2017 | Peterson | B33Y 10/00 |
| 2017/0263159 A1* | 9/2017 | Eichhorn | G09B 23/288 |
| 2018/0012515 A1* | 1/2018 | Loan | G09B 9/00 |
| 2020/0211419 A1* | 7/2020 | Hiyama | G09B 23/28 |
| 2020/0312194 A1* | 10/2020 | Sandor | A61M 16/0488 |

* cited by examiner

METHOD, SYSTEM, AND APPARATUS FOR MODELING A HUMAN TRACHEA

BACKGROUND

Oxygen deprivation can cause permanent brain damage or even death to a patient within minutes. Proper airway management is therefore imperative to the successful resuscitation of a compromised patient. Endotracheal intubation is indicated in several clinical situations including oxygenation failure (hypoxia), upper airway obstruction, cardiorespiratory arrest, ventilation failure (hypercarbia), and respiratory distress, in patients at risk for aspiration, and for certain elective and diagnostic procedures. Endotracheal intubation refers to the placement of a flexible tube into the trachea (windpipe) in order to maintain a patient's airway; the procedure provides an artificial conduit for alveolar gas exchange and protection of the lungs. Endotracheal intubation can be hazardous, particularly as a patient deteriorates in health. In such stressful and potentially life-threatening circumstances, it is essential that clinicians be well-versed in the anatomy of the respiratory system so that they can provide immediate and proper care.

A comprehensive understanding of respiratory anatomy, physiology, and disease requires accurate visualization of the anatomical structures. There are many different types of visual aids that have been used to supplement the study of the human body, including anatomical illustrations, cadaver dissections, digital animations, static radiographic images, and physical models. In particular, anatomical models are three-dimensional representations of human anatomy that replicate and/or simulate the structure, position, and interrelation of its various components. Anatomical models can resemble different aspects of the human body, such as a skeleton, head, torso, individual organ, or organ system. Current anatomical models of the respiratory system, for example, include models of both the upper and lower respiratory systems, as well as individual respiratory organs (e.g., the nasal cavity, pharynx, larynx, trachea, bronchi, and lungs).

In many instances, anatomical models serve as educational and/or demonstration tools to study and explain the structures of the human body. For example, a respiratory therapist testifying as an expert witness in court may use a respiratory tract model to help clarify testimony relating to tracheal-related complications. In other instances, anatomical models may be used for training medical professionals in interventional, surgical, and diagnostic procedures. Anatomical models allow clinicians to practice at least some aspects of a particular procedure prior to performing on a living patient. While current anatomical models may assist in these endeavors, they fail to account for deviations in airway pathology. Conventional anatomical models resemble normal respiratory anatomy, and thus simulate uncomplicated, lower-risk clinical scenarios. These models are severely limited in practical application as a significant portion of living patients exhibit abnormal or difficult airway anatomy.

Accordingly, there remains a need for an anatomical model that guides proper airway management for patients having abnormal or difficult airway anatomy. There is also a need for an anatomical model that can demonstrate the effects of varying laminar and turbulent airflows in relation to specific tracheal diseases.

SUMMARY

An anatomical model and method of using the same may be described herein. The anatomical model may replicate an anatomically correct human trachea having various tracheal conditions that either partially or completely occlude a patent airway. The anatomical model may facilitate the training of proper airway management in a number of emergency situations, including the intubation of the human trachea on a patient having an upper airway obstruction. The model may help to visualize the effects of an endotracheal tube on varying laminar and turbulent airflows in relation to specific tracheal conditions and/or diseases. The anatomical model may also serve as a demonstrative aid for acute respiratory distress caused by the swelling or inflammation of tracheal walls.

In one exemplary embodiment, an anatomical model may simulate a tracheal airway and be able to demonstrate complications associated therewith. The anatomical model may releasably connect to a mounting fixture via a fastening mechanism that engages at least a portion of the model. The anatomical model may include a simulated trachea structure having a proximal end, a distal end, and an elongated tubular body extending therebetween. The elongated tubular body may define a central bore having a predetermined diameter and length therein. A series of annular rings may be arranged along the tubular body at predetermined intervals to simulate cartilaginous rings in the human trachea. An artificial skin layer may be positioned over the tubular body and surround at least an exterior portion thereof. An opening may exist through the artificial skin layer and penetrate into the simulated trachea. The opening may imitate a tracheal stoma in the neck, and be configured to receive a conventional tracheostomy tube. A foam material may be distributed underneath the artificial skin layer, proximate the opening, to mimic the tactile sensation of subcutaneous emphysema. The anatomical model may further include one or more airway obstructive elements connected to the simulated trachea structure for causing a volume restriction of the central bore. The airway obstructive elements may simulate various respiratory tract complications, including, but not limited to, tracheal innominate fistula, false tract, tracheal stenosis, swollen carina, and tracheal laceration.

In some exemplary embodiments, the anatomical model may have a simulated tracheal carina disposed at the distal end of the simulated trachea structure. The simulated tracheal carina may bifurcate into two bronchial passages, wherein one of the passages represents a right bronchus and the other passage represents a left bronchus. Each bronchial passage may extend from the distal end of the simulated trachea structure at an angle of about 45 degrees therefrom.

In some exemplary embodiments, the anatomical model may include a simulated epiglottis structure positioned at the proximal end of the simulated trachea. The simulated epiglottis structure may form a flap-like protrusion that extends from an inner surface of the tubular body. The anatomical model may further contain at least one simulated vocal cord disposed proximate the simulated epiglottis structure.

According to another exemplary embodiment, an anatomical model may simulate a tracheal airway with inflatable infrastructure. The anatomical model may include a trachea structure formed from a pliable tube with central lumen that replicates a human airway. A number of inflatable bladders may attach to and extend the length of the pliable tube, each bladder representing a different type of medical condition that obstructs normal airway anatomy. The inflatable bladders may be communicatively coupled, via air conduits, to a control unit that regulates airflow from an internal air supply. The control unit may include a control panel that enables an operator to selectively manipulate the incremental inflation and/or deflation of each bladder simultaneously. In this way, the model may illustrate the effect of various tracheal conditions during different stages of swelling and/or inflammation.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION OF THE DRAWINGS

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

An anatomical model and method of using the same may be described. The anatomical model may facilitate training of proper airway management in a number of emergency situations. For example, the anatomical model may be used to teach intubation of the human trachea on a patient having an upper airway obstruction. The anatomical model may also be used as a demonstrative visual aid to assist in the understanding of respiratory anatomy. Exemplary tracheal diseases and/or conditions causing upper airway obstruction and for which the anatomical model may replicate include, but are not limited to, tracheal stenosis, tracheal tumor, false tract, subcutaneous emphysema, and tracheal laceration.

One exemplary tracheal condition further described herein includes tracheal stenosis, a narrowing of the windpipe that can result from trauma, chronic inflammatory diseases, radiation therapy, repeated irritation after prolonged intubation and congenital disorders. Approximately 90% of all cases of acquired chronic subglottic stenosis in children and adults result from endotracheal intubation or tracheostomy. Stenosis thus commonly occurs at the cuff of the tube (intrathoracic trachea) or at the level of the tracheostomy stoma (extrathoracic trachea).

Figure 1:
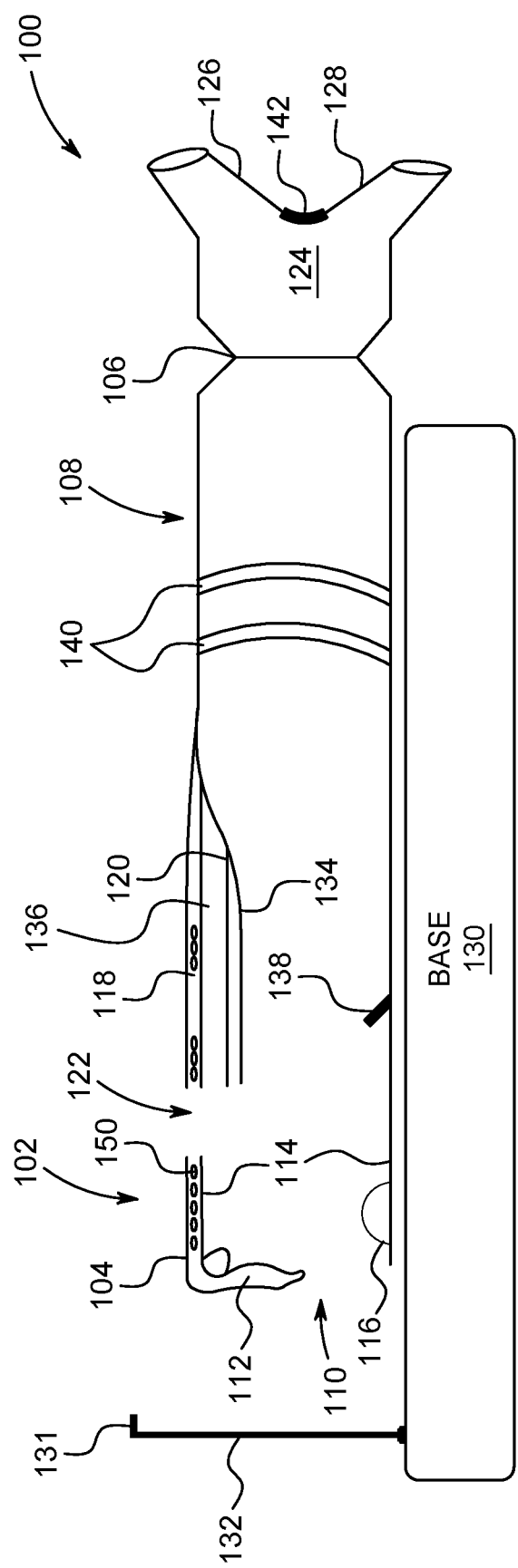
FIG. 1 may illustrate an exemplary embodiment of an anatomical model according to the present invention.

FIG. 1 may illustrate an exemplary embodiment of an artificial anatomical model 100 in accordance with the present invention. The anatomical model 100 may replicate various physiological structures of the human anatomy and demonstrate the effects of predefined diseases on the tracheal airway. Consequently, the anatomical model 100 may serve as a training apparatus for teaching tracheal intubation and proper airway management on patients having upper airway obstruction(s). In some exemplary embodiments, the anatomical model 100 may simulate diseases causing upper airway obstruction(s) including, but not limited to, subcutaneous emphysema, tracheal innominate fistula, false tract, tracheal stenosis, swollen carina, and tracheal laceration.

As illustrated in FIG. 1, the anatomical model 100 may represent a human throat existing along a vertical cross-sectional plane. According to the exemplary embodiment, the anatomical model 100 may include a simulated trachea structure 102 having a proximal end 104, a distal end 106, and an elongated tubular body 108 extending therebetween. The tubular body 108 may define a central bore 110 of a predetermined diameter that represents the diameter of a human trachea. In some exemplary embodiments, a plurality of annular rings (not shown) may be arranged around the tubular body 108 to simulate the incomplete C-shaped cartilaginous rings that reinforce the anterior and lateral sides of the human trachea. In one exemplary embodiment, for example, approximately 16-20 annular bands may surround the tubular body 108 at predetermined intervals corresponding to the cartilaginous rings in the human trachea. In other exemplary embodiments, the simulated trachea structure 102 may be formed of corrugated tubing to simulate the tracheal cartilage. The dimensions of the tubular body 108 may vary depending on a particular application. In one embodiment, the tubular body 108 extend appropriately 12 inches in length, and have a 2-inch diameter.

The anatomical model 100 may further include additional anatomical features of the upper respiratory tract. For example, a simulated epiglottis structure 112 may be positioned at the proximal end 104 of the simulated trachea 102. The simulated epiglottis 112 may form a flap-like protrusion extending from an interior surface 114 of the tubular body 108. The simulated epiglottis 112 may attach to the interior surface 114 via a hinged connection providing the flexibility needed to replicate normal epiglottal functionality (e.g., prevent swallowed matter from entering the trachea). For example, the act of bending the epiglottis 112 upward may reveal the central bore 110 of the simulated trachea structure 102, while advancing the epiglottis 112 downward may block such entrance. The epiglottis structure 112 may be constructed of a metal insert coated with silicone rubber, the shape of which resembles normal epiglottis anatomy.

Simulated vocal cords 116 may attach to the interior surface 114 of the tubular body 108 proximate (and just underneath) the simulated epiglottis structure 112. The simulated vocal cords 116 may form wedge-shaped flanges that partially obstruct the central bore 110. In some exemplary embodiments, it may become necessary to visually distinguish the various anatomical features from one another. As such, each anatomical feature may have one or more visual identifiers associated therewith. In one exemplary embodiment, for example, the simulated vocal cords 116 may be constructed of a color-treated substrate having a white or pale color appearance.

In some exemplary embodiments, the anatomical model 100 may include an artificial skin layer 118 disposed on an exterior surface 120 of the simulated trachea 102. The artificial skin layer 118 may be fabricated from a soft, compressive material that is adapted to mimic the mechanical properties of native human tissue (e.g., realistic skin texture). In one exemplary embodiment, for example, the skin layer 118 may be made of a natural or synthetic rubber composition. The skin layer 118 may surround the simulated trachea structure 102 in its entirety or may alternatively cover only a discrete portion thereof. The anatomical model 100 may simulate subcutaneous emphysema via a foam material 150 embedded underneath the artificial skin layer 118. The foam material 150 may contain a plurality of Styrofoam microbeads embedded in a gelatinous material. In some exemplary embodiments, the foam material 150 may contain the substance "Slime Ballz," manufactured by FloraCraft.

An opening 122 may exist through the artificial skin layer 118 and extend within the simulated trachea structure 102 to the central bore 110. The opening 122 may simulate a tracheal stoma in the neck, the opening 122 being sized and shaped to receive a conventional tracheostomy tube therein. In some exemplary embodiments, for example, the opening may have a diameter of approximately 0.75 inches.

A simulated tracheal carina 124 may be positioned at the distal end 106 of the simulated trachea structure 102. The simulated tracheal carina 124 may bifurcate into two bronchial passages 126, 128 representing left and right bronchi, respectively. Each bronchial passage 126, 128 may extend from the distal end 106 of the trachea structure 102 at an angle of about 45 degrees therefrom. The tracheal carina 124 may contain a thicker rubber portion having a thickness of approximately ⅛ to ¼ inches.

The anatomical model 100 may attach to a base member 130 for providing additional support to the anatomical model 100 in order to maintain its horizontal position. The base member 130 may form a platform having an upper surface and a lower surface. The base member 130 may be constructed from any suitable material, such as metal, wood, cardboard, plastic resin, and the like. The base member 130 may further include means for releasably adhering the anatomical model to the upper surface thereof. In some exemplary embodiments, and as illustrated in FIG. 1, the releasable adhering means may include a screw mechanism 132 (e.g., screw), and a hook and loop fastener 131 (e.g., Velcro® strap). It should be understood by one having ordinary skill in the art that the adhering means may not be limited to, but may include screws, hook and loop fasteners, cable ties, glues, adhesives, and any other form of fastening mechanism suitable for securing and attaching an anatomical model.

The human trachea may develop upper airway obstruction(s) due to, for example, tracheal innominate fistula, false tract, tracheal stenosis, swollen carina, and tracheal laceration. As illustrated in FIG. 1, the anatomical model 100 may include one or more airway obstructive elements for simulating the aforementioned conditions. Generally, each airway obstructive element may attach to the simulated trachea structure 102 for causing a volume restriction of the central bore 110. The airway obstructive elements may vary in shape and/or configuration depending on the desired simulation. For example, airway obstructive element 134 may simulate tracheo-innominate fistula, or an abnormal connection between the innominate artery (brachiocephalic trunk or brachiocephalic artery) and the trachea. The element 134 may form a thin, generally cylindrical projection that extends along the interior surface 114 of the tubular body 108. In some exemplary embodiments, the projection 134 may be colored blue, stretch approximately two inches in length, and have a diameter of approximately 0.08-0.2 inches.

Airway obstructive element 136 may simulate the creation of a false passage (i.e., false tract) in the anterior tissues of the neck. A tracheostomy tube can be displaced completely (decannulation) or partially (dislodgement) when the distal end of such tube passes into the paratracheal soft-tissue, rather than the tracheal airway. To simulate such complication, element 136 may form a space or passageway between the artificial skin layer 118 and the elongated tubular body 108. The space may originate near opening 122, and extend approximately 2-3 inches in length.

Airway obstructive element 138 may simulate a posterior tracheal laceration, characterized by one or more perforations of the tracheal wall. Element 138 may include at least one aperture through the interior surface 114 of the tubular body 108. The aperture may measure approximately ¼-½ inch wide, and approximately ½-1 inch deep. The aperture may be located opposite opening 122, and beneath said opening 122 by a distance of approximately 1 inch.

Airway obstructive element 140 may simulate tracheal stenosis. Airway obstructive element 140 may form an annular reinforcing member that reduces an inner diameter of the central bore 110. The element 140 may be, for example, a permanently-affixed rubber enhancement that creates a non-uniform wall thickness of the tubular body 108. In some exemplary embodiments, multiple elements 140 may narrow distinct segments of the tubular body 108 to varying degrees. As illustrated in FIG. 1, for example, a first element 140 may decrease the inner diameter by approximately 50%, and a second element may decrease the inner diameter by approximately 70%.

Airway obstructive element 142 may simulate a swollen carina. The simulated tracheal carina 124 may contain a thicker rubber portion 142 having a thickness of approximately ⅛ to ¼ inches. The rubber portion 142 may be dyed a red color.

The anatomical model 100 may provide a realistic tactile experience for inserting a tracheotomy tube into the stoma of a patient. The anatomical model 100 may illustrate the effects of various tracheal diseases and/or conditions on the patent airway. The anatomical model 100 may be suitable for performing medical procedures thereon that include gaining access to a patient airway. For example, the anatomical model 100 may allow the performance of cricothyrotomy and/or tracheotomy procedures. The anatomical model may also be useful in teaching proper placement of a tracheotomy tube. For example, a user may insert a first end of the tracheotomy tube through the opening 122 representing the stoma, and into the trachea structure 102. The user may secure the tracheotomy tube through the fastening mechanism of the base member 130.

Figure 2:
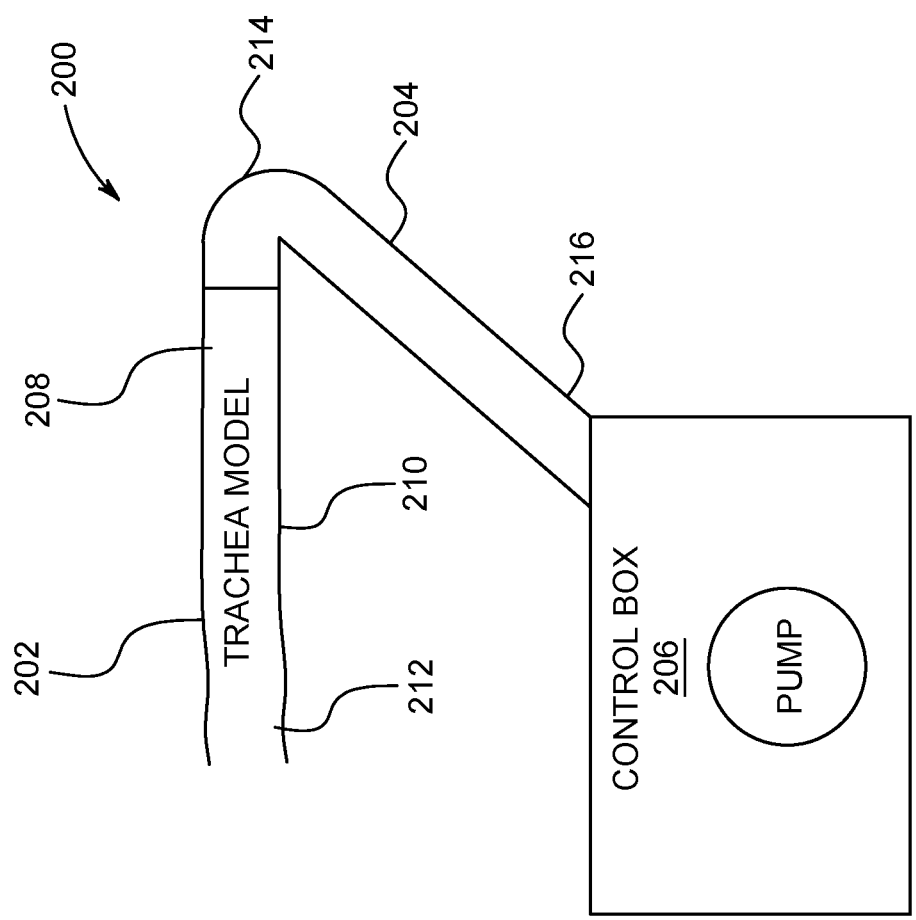
FIG. 2 may illustrate another exemplary embodiment of an anatomical model in accordance with the present invention.

FIG. 2 may illustrate another exemplary embodiment of an anatomical model 200 in accordance with the present invention. The anatomical model 200 may simulate a tracheal airway and be able to demonstrate complications associated therewith. The anatomical model 200 may include a simulated trachea structure 202, an air conduit covering 204, and a control unit 206. The trachea structure 202 may have a proximal end 208, a distal end 212, and a middle section 210 disposed therebetween. The trachea structure 202 may be formed from a pliable tube with central lumen that replicates a human airway. A number of inflatable bladders may attach to at least a portion of the surface of the trachea structure 202 and may selectively engage the central lumen thereof upon inflation of the bladder chamber.

Each inflatable bladder may be in communication with an individual air conduit having a two-way selector valve that regulates airflow to and from the chamber. A flexible covering 204 may have a first end 214 removably coupled to the proximal end 208 of the trachea structure 202 and a second end 216 removably coupled to an outlet of the control unit 206. The flexible covering 204 may surround and completely enclose a length of the individual air conduits, for example extending from the trachea structure 202 to the control unit 206. A control unit 206 may house an internal air supply that provides pressurized air to the inflatable bladders. The internal air supply may be a manually operated hand pump, an electrical air compressor, or any other type of suitable air supply as would be understood by a person having ordinary skill in the art.

Figure 3:
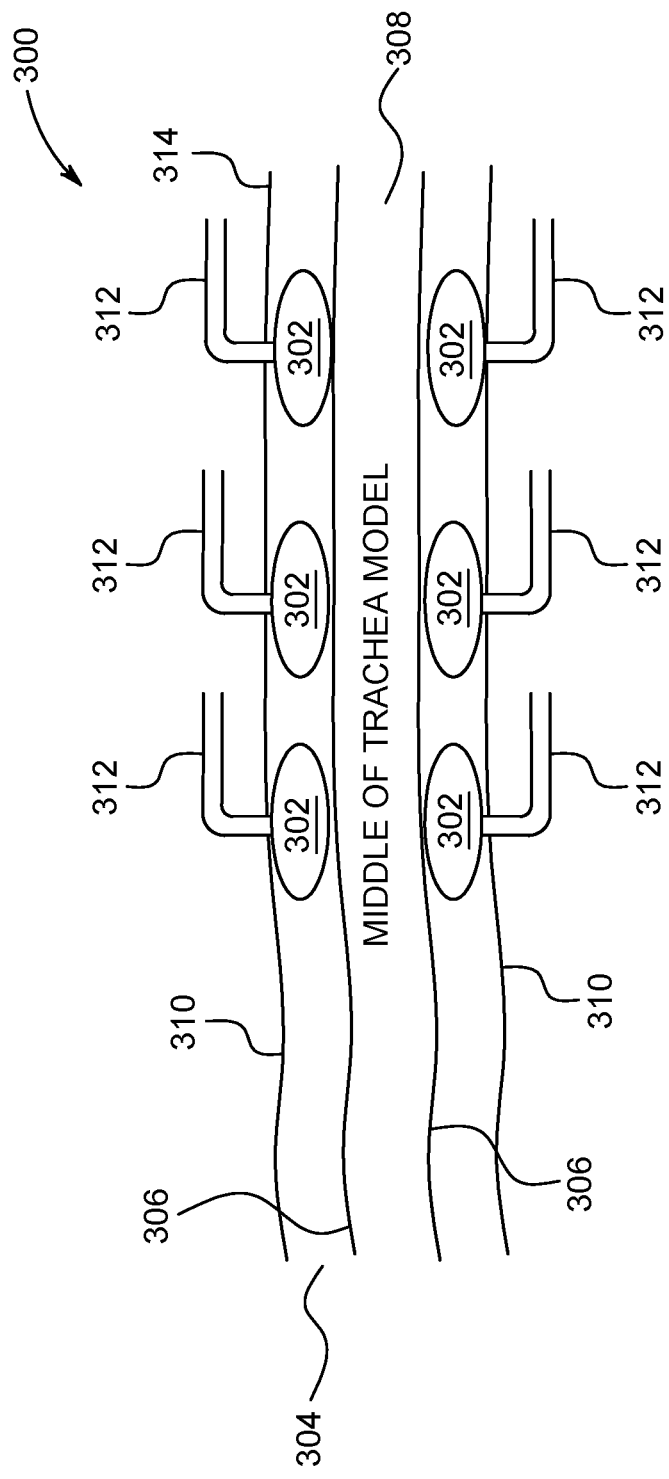
FIG. 3 may illustrate an exemplary embodiment of a trachea structure with inflatable air bladders.

FIG. 3 may illustrate an exemplary embodiment of a trachea structure 300 with inflatable bladders 302 situated along a length thereof. In some exemplary embodiments, the trachea structure 300 may simulate a human trachea from the cricoid cartilage to the bifurcation of the main bronchi. The trachea structure 300 may also have crenellations that represent the tracheal cartilages. The trachea structure 300 may be constructed from an elongated annular tube 304 having an inner wall 306 that defines a central lumen 308 therein. A number of inflatable bladders 302 may be disposed proximate the central lumen 308, in a space defined by the inner wall 306 and an outer wall 310 of the trachea structure 300. The total diameter of the annular tube 304 may measure approximately 5 inches, with the diameter of the inner wall 306 being approximately 2 inches.

Each inflatable bladder 302 may represent a different inflamed or diseased section of the trachea that obstructs normal airway anatomy. Each inflatable bladder 302 may include an expandable chamber body in communication with an air conduit 312 for adjustable inflation. Each air conduit 312 may lie within and extend the length of the tracheal structure 300 from an entrance point at the proximal end 314 thereof to its connection with a respective inflatable bladder 302. Air may flow through the air conduits 312 towards the bladders 302 inflating targeted segmented areas on the model. When each of the bladders 302 is in a deflated state, the trachea structure 300 may assume the appearance of a normal airway. When the bladders 302 are inflated in a customized manner, the tracheal structure 300 may represent an abnormal airway having a specified disease and/or tracheal complication. The inner wall 306 of the annular tube 304 may be made of compressible material that reduces the volume of the central lumen 308 when under sufficient load from the inflatable bladders 302. Therefore, once the pressure inside the chamber body reaches sufficient capacity, the bladder 302 will indirectly displace the area of the inner tracheal wall 306 representing the inflamed diseased section of the trachea. The anatomical model may thus demonstrate the effect of tracheal conditions on the airway during various stages of inflammation and/or disease.

Figure 4:
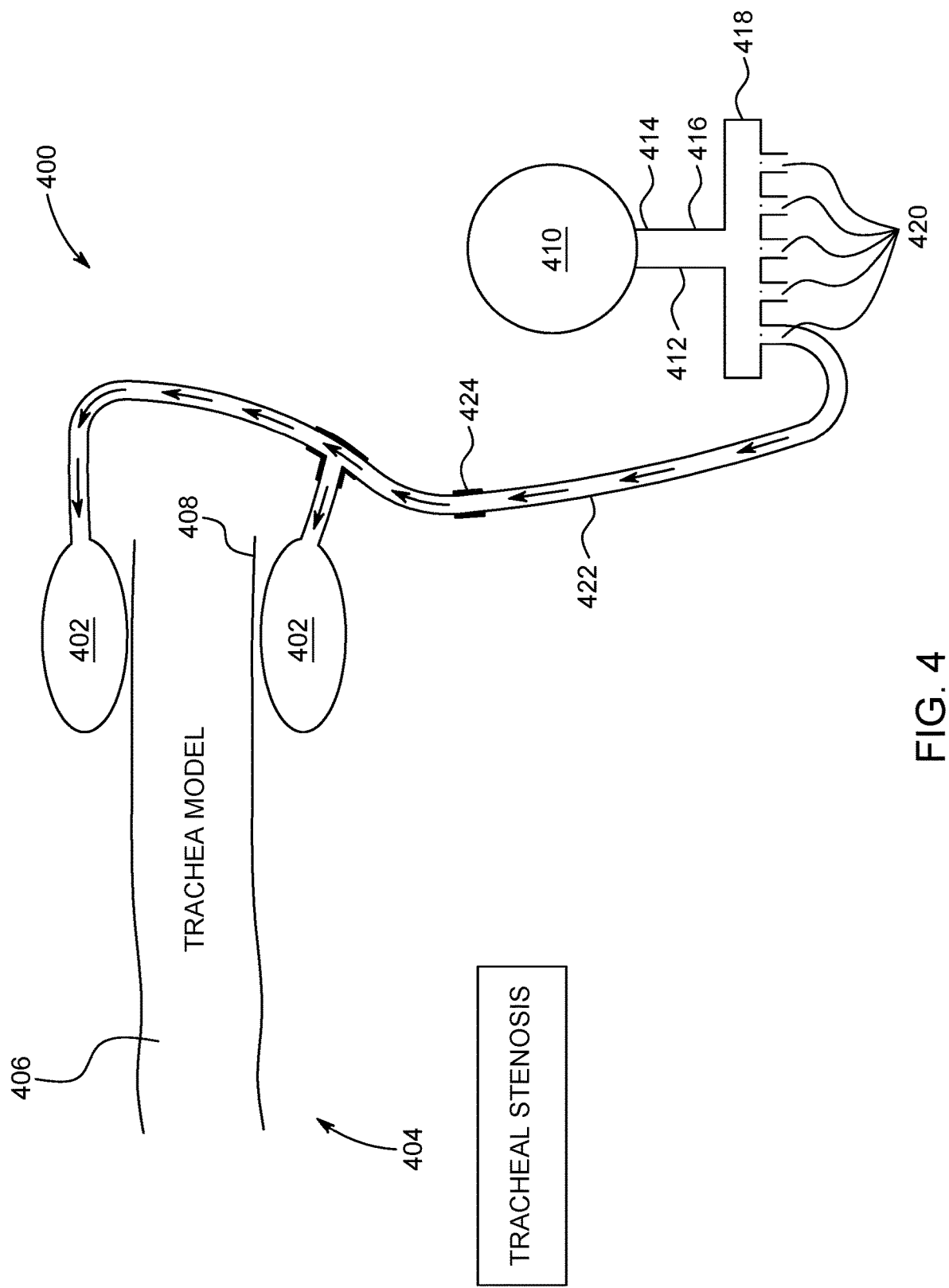
FIG. 4 may illustrate an exemplary embodiment of an anatomical model of a trachea exhibiting tracheal stenosis.

FIG. 4 may represent an exemplary embodiment of an anatomical model of a trachea 400 exhibiting tracheal stenosis. As described above, tracheal stenosis refers to the narrowing of the central air passageway formed in the trachea. Tracheal stenosis may involve ulceration of the mucosa and cartilage, inflammatory reactions with associated granulation tissue, fibrous tissue formation, and contraction of fibrous scar tissue. The location of stenosis may be divided into five regions within the central airway: 1) upper one third of the trachea; 2) middle one third of the trachea; 3) lower one third of the trachea; 4) right main bronchus; and 5) left main bronchus. Inflatable bladders 402 of the present invention may be arranged along the trachea structure 404 to simulate at least one region of stenosis, multiple independent regions of stenosis, each independent region of stenosis, or any combination thereof.

Furthermore, the degree of stenosis at any one site can be assigned a numerical code. For example, code 0 may represent nonappreciable stenosis, while codes 1-4 may be assigned, respectively, to an approximate 25%, 50%, 75%, and 90% reduction in cross-sectional area. Code 5 may represent complete occlusion. Variable and selective inflation of the bladders 402 can mimic the varying degrees of obstruction at anyone site of stenosis from code 0 to code 5. Such simulation of the aforementioned varying degrees of obstruction may be achieved by controlling the amount of pressurized air delivered to the chamber body of each inflatable bladder 402.

A simulated trachea structure 404 according to the present invention, and as shown in FIG. 4, may demonstrate 50% stenosis in the upper one third region of the trachea. A pair of inflatable bladders 402 may flank the central lumen 406 of the trachea structure 404 on opposing sides near the proximal end 408, effectuating volume restrictions of at least a third portion thereof. An air supply system 410 may be provided to deliver pressurized air to the chamber body of each inflatable bladders, thereby simulating normal and/or abnormal breathing patterns. The air supply system 410 can compel air or other gaseous forms into a central inflation conduit 412, and can include, but is not limited to a hand pump, syringe, or other mechanical device known by a person having ordinary skill in the art to pressurize air. A first end 414 of the central inflation conduit 412 may be in communication with the air supply system 410, and a second end 416 of the central inflation conduit 412 may be coupled to a conduit splitter 418. The conduit splitter 418 can include a number of outlet conduits 420 that correspond to the air conduits 422 of each respective inflatable bladder 402. Each air conduit 422 may include a two-way valve 424 that allows for the selective passage of air flowing to and from each inflatable bladder 402. The two-way valve may be controlled by any mechanical device known in the art.

As depicted in FIG. 4, when the two-way valve 424 is in an open position, air may flow from the air supply system 410 to the specified inflatable bladders 402 representing tracheal stenosis. The air conduits 422 may deliver an amount of pressurized air to the chamber body of each inflatable bladder 402 to resemble the degree of simulated tracheal stenosis. For example, inflating the bladder segments 402 to full capacity may simulate a code 5 complete occlusion of the trachea.

Figure 5:
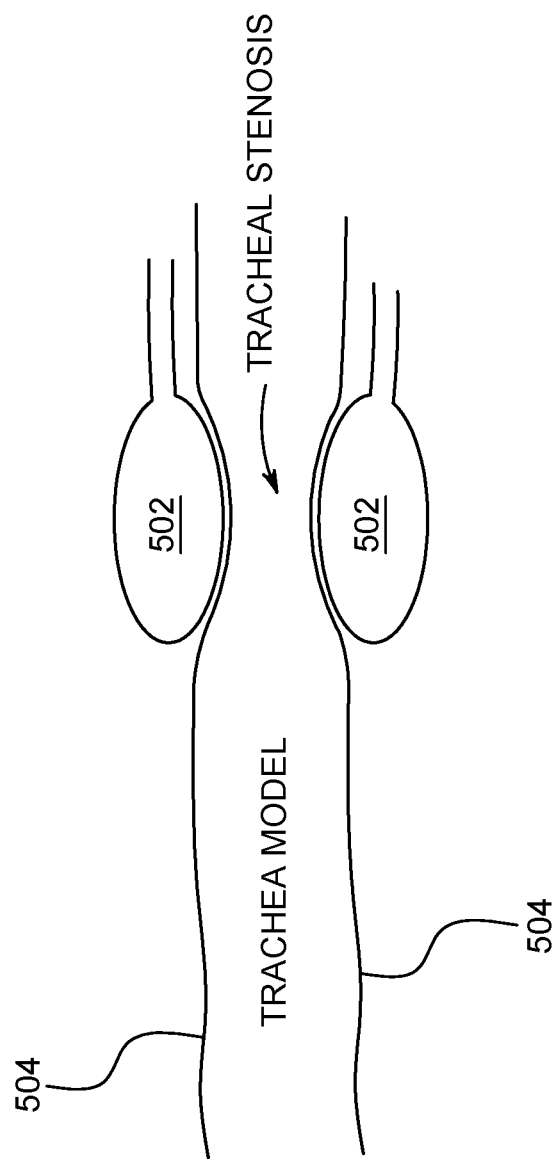
FIG. 5 may illustrate an exemplary embodiment of a tracheal structure with inflatable air bladders that simulate tracheal stenosis.

Referring now to FIG. 5, further operation of the trachea model of FIG. 4 simulating tracheal stenosis may be depicted. As the inflatable bladders 502 fill with pressurized air, the larger the volume of each inflatable bladder 502, compelling engagement and further compression of the inner wall 504 of the tracheal tube. The inward protrusion of the inner wall 504 may represent the physical manifestation of tracheal stenosis, or the narrowing of the windpipe.

Figure 6:
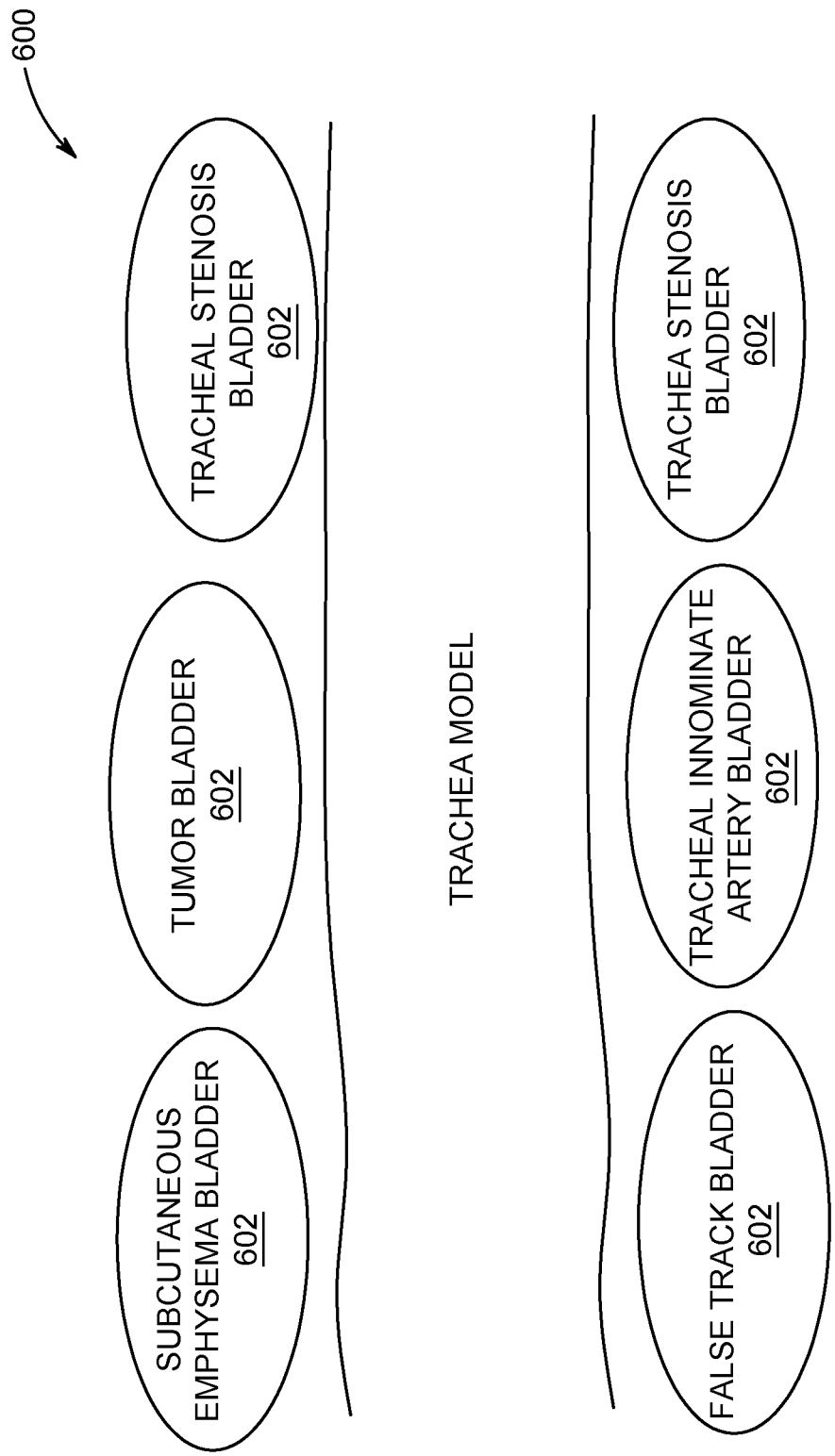
FIG. 6 may illustrate an exemplary embodiment of a trachea structure with segmented, inflatable air bladders that replicate various tracheal conditions.

FIG. 6 may illustrate an exemplary embodiment of a trachea structure 600 with segmented, inflatable air bladders 602, each bladder 602 simulating a various tracheal condition. The inflatable bladders 602 can be configured in many different arrangements that represent traditional areas of tracheal inflammation. In particular, the inflatable bladders 602 may be arranged to signify areas of abnormal protrusion corresponding to various tracheal conditions, including but not limited to tracheal stenosis, tracheal tumor, false track pocket, subcutaneous emphysema, and innominate artery laceration. The inflatable bladders 602 can be formed of a flexible airtight material, such as but not limited to vulcanized rubber, polyurethane, polyvinyl chloride (PVC) or any other type of polymer, rubber, or other resilient material as would be understood by a person having ordinary skill in the art.

Figure 7:
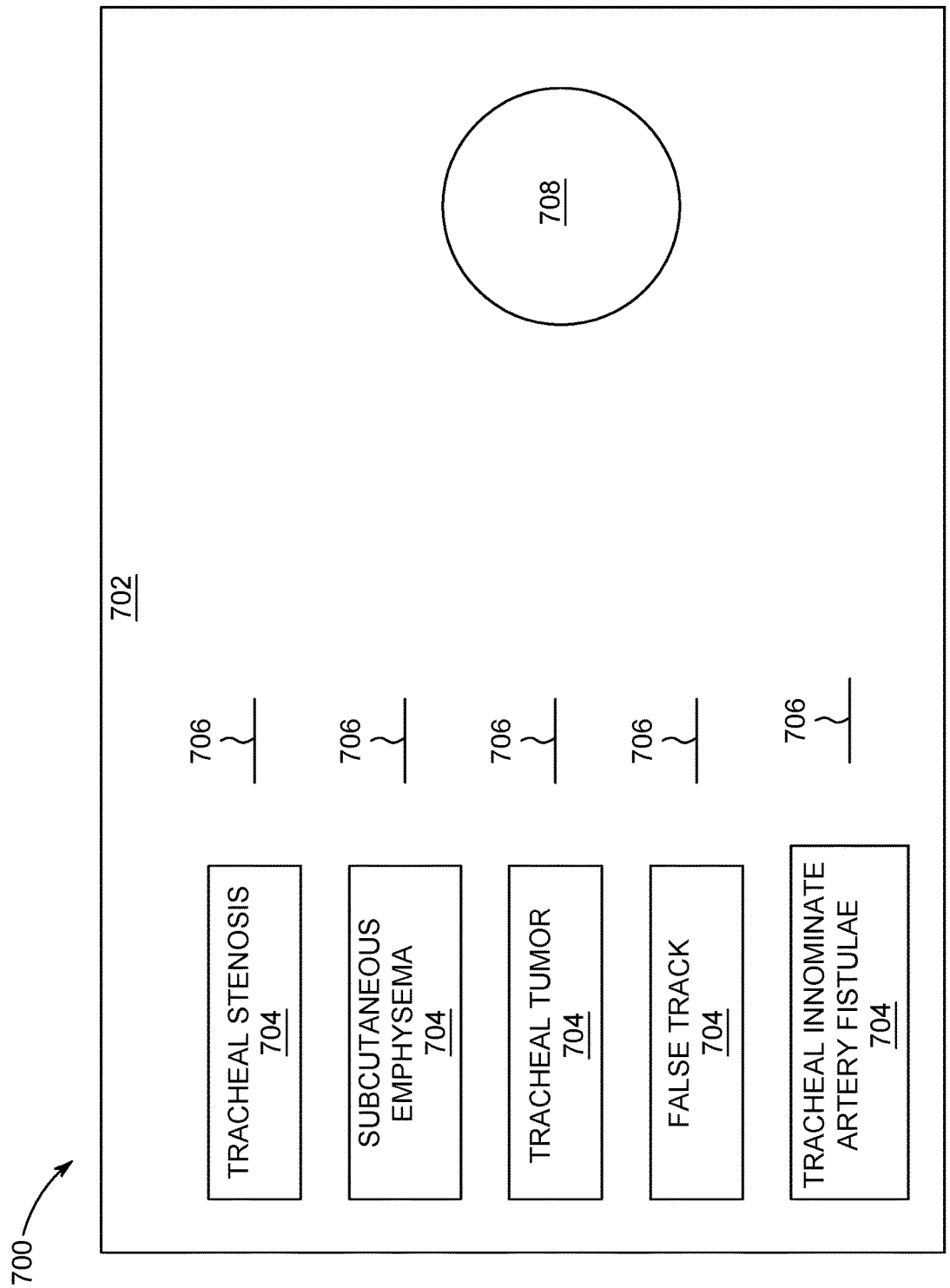
FIG. 7 may illustrate an exemplary embodiment of a control unit interface.

FIG. 7 may illustrate an exemplary embodiment of a control unit interface 700. The control unit may include a control panel 702 that enables an operator to selectively manipulate the incremental inflation and/or deflation of each bladder simultaneously. The control unit 700 may be equipped with different tracheal modules of settings 704 that pertain to the various tracheal conditions for which the anatomical model may simulate. Each tracheal module 704, designating a specific disease or condition, may include a switch 706 that regulates the two-way valve of a corresponding air conduit. The switch 706 can be configured to operate in an open, neutral, and closed position. The control unit 700 may further include an operating button 708 for the air supply system. The operation of the air supply system by the operating button 708 may be achieved through any appropriate electrical or mechanical device, as desired. An operator may select a tracheal disease or condition in which to simulate from the various tracheal modules displayed on the control panel 702. The disease or condition displayed in FIG. 7 is merely exemplary and the tracheal module 704 may be dynamic so as to provide for different models, simulations or otherwise designate any specific disease or condition to be simulated. The operator can deploy the switch of module 704 corresponding to the desired tracheal disease or condition to an open, inflate position. The operator can then initiate the air supply system by depressing the operating button 708 to inflate the corresponding inflatable bladders. Once the pressure inside the chamber body reaches sufficient capacity, the bladder will indirectly displace the area of the inner wall, representing the inflamed/diseased section of the trachea. The anatomical model may thus demonstrate the effect of tracheal conditions on the airway during various stages of inflammation and/or disease. An operator may also simulate more than one tracheal condition at once, allowing multiple areas to display swelling.

Figure 8:
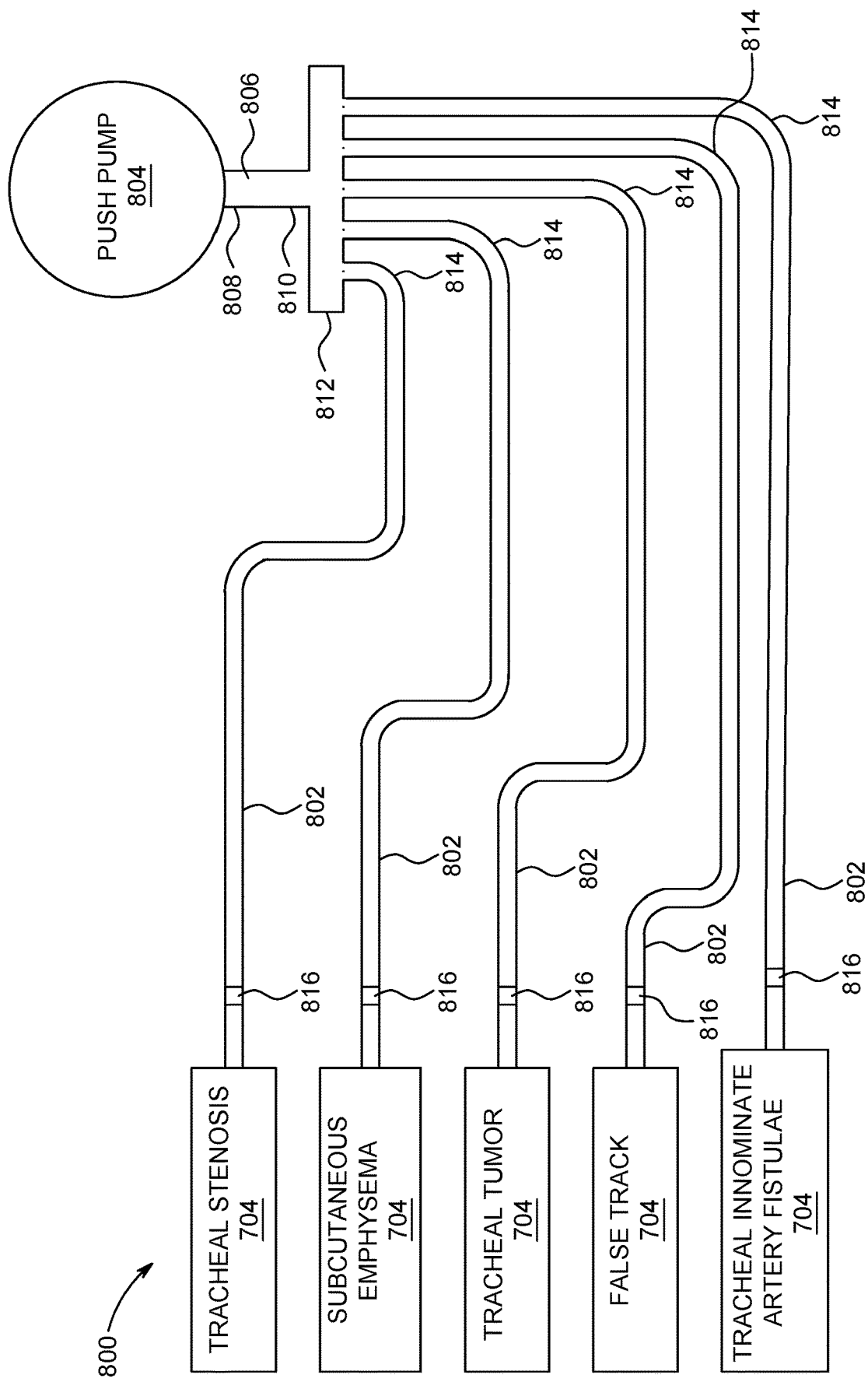
FIG. 8 may illustrate an exemplary embodiment of an arrangement of air conduits connected to an air supply.

FIG. 8 may illustrate an exemplary embodiment of an arrangement of air conduits connected to an air supply. Each air conduit 802 may represent a different tracheal disease or condition for which the anatomical model may simulate. As shown in FIG. 8, the represented tracheal diseases and/or conditions may include: tracheal stenosis, subcutaneous emphysema, tracheal tumor, false track pocket, and tracheal innominate artery fistula. A first end 808 of the central inflation conduit 806 may be in communication with the air supply system 804, and a second end 810 of the central inflation conduit 806 may be coupled to a conduit splitter 812. The conduit splitter 812 can include a number of outlet conduits 814 that correspond to the air conduits 802 of each respective inflatable bladder. Each air conduit 802 may include a two-way valve 816 that allows for the selective passage of air flowing to and from each inflatable bladder (not shown). The two-way value may be controlled by any known device, as desired. The air conduits 802, conduit splitter 812, central inflation conduit 806, and air supply system 804 may all be housed within the control unit 800. Alternatively, any one component, or any combination thereof may be disposed within a control unit housing.

In some exemplary embodiments, the anatomical model of the present invention may be used for training tracheal intubation. The anatomical model may include an airway structure from the mouth to the trachea of the human body. An operator may insert various tracheal and endotracheal tubes into the anatomical model to study the effects of varying laminar and turbulent airflows in relation to specific diseases.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An anatomical model comprising:
   a simulated trachea structure having a proximal end, a distal end, and an elongated tubular body extending therebetween, the elongated tubular body defining a central bore of a predetermined diameter;
   an artificial skin layer positioned over an exterior surface of the tubular body;
   an opening formed through the artificial skin layer and extending within the simulated trachea structure, the opening being configured to receive a tracheostomy tube;
   a foam material embedded underneath the artificial skin layer proximate the opening; and
   at least one airway obstructive element connected to the simulated trachea structure for causing a volume restriction of the central bore;
   wherein the at least one airway obstructive element simulates a false passage, the false passage being disposed between the artificial skin layer and the elongated tubular body, and originating proximate the opening and extending towards the distal end.

2. The anatomical model of claim 1, further comprising a simulated tracheal carina positioned at the distal end of the simulated trachea structure, the simulated tracheal carina bifurcating into two bronchial passages.

3. The anatomical model of claim 2, wherein each of the bronchial passages extends from the distal end of the trachea structure at an angle of 45 degrees therefrom, and wherein one of the bronchial passages represents a right bronchus and the other bronchial passage represents a left bronchus.

4. The anatomical model of claim 2, wherein the simulated tracheal carina is colored red to simulate swelling.

5. The anatomical model of claim 1, further comprising a simulated epiglottis structure positioned at the proximal end of the simulated trachea structure.

6. The anatomical model of claim 5, wherein the simulated epiglottis structure forms a flap-like protrusion extending from an inner surface of the tubular body.

7. The anatomical model of claim 5, further comprising at least one simulated vocal cord disposed proximate the simulated epiglottis structure.

8. The anatomical model of claim 1, further comprising a base member for mounting at least a portion of the simulated trachea structure thereto.

9. The anatomical model of claim 1, wherein the simulated trachea structure extends 12 inches in length.

10. The anatomical model of claim 1, wherein the predetermined diameter is 2 inches.

11. The anatomical model of claim 1, further comprising a plurality of annular rings arranged at predetermined intervals along the tubular body for simulating tracheal cartilage.

12. The anatomical model of claim 1, wherein the at least one airway obstructive element further simulates at least one of the following tracheal complications: tracheal innominate fistula, tracheal stenosis, swollen carina, and tracheal laceration.

13. The anatomical model of claim 1, wherein the tubular body has a non-uniform wall thickness, a portion of the wall decreasing in diameter by 50-70 percent.

14. The anatomical model of claim 1, wherein the artificial skin layer is constructed from a natural or synthetic rubber.

15. The anatomical model of claim 1, wherein the opening has a diameter of 0.75 inches.

16. The anatomical model of claim 1, wherein the foam material comprises polystyrene foam microbeads.

17. The anatomical model of claim 1, wherein the simulated trachea structure is constructed of at least one of: silicone, rubber, and plastic.

18. The anatomical model of claim 1, further comprising a plurality of inflatable bladders situated along the length of the elongated tubular body, and between the elongated tubular body and an outer wall of the trachea structure.

19. The anatomical model of claim 18, further comprising an air conduit in communication with each inflatable bladder of the plurality of inflatable bladders, the air conduit lying within and extending the length of the tracheal structure from the inflatable bladder to an entrance point at the proximal end of the tracheal structure.

* * * * *